(12) United States Patent
Treichel

(10) Patent No.: US 11,976,753 B2
(45) Date of Patent: *May 7, 2024

(54) TUBING SYSTEM WITH JACKET

(71) Applicant: Omega Flex, Inc., Middletown, CT (US)

(72) Inventor: Steven A. Treichel, West Chester, PA (US)

(73) Assignee: OMEGA FLEX, INC., Middletown, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,425

(22) Filed: Jul. 25, 2022

(65) Prior Publication Data

US 2022/0356967 A1 Nov. 10, 2022

Related U.S. Application Data

(63) Continuation of application No. 17/269,383, filed as application No. PCT/US2019/047002 on Aug. 19, 2019, now Pat. No. 11,428,349.

(60) Provisional application No. 62/724,788, filed on Aug. 30, 2018.

(51) Int. Cl.
*F16L 11/15* (2006.01)
*B32B 1/08* (2006.01)
*F16L 11/12* (2006.01)

(52) U.S. Cl.
CPC ............... *F16L 11/15* (2013.01); *B32B 1/08* (2013.01); *F16L 11/12* (2013.01); *F16L 2201/30* (2013.01)

(58) Field of Classification Search
CPC ........ F16L 11/15; F16L 11/12; F16L 2201/30; B32B 1/08

USPC ......................................... 138/121, 137, 140
See application file for complete search history.

(56) References Cited

U.S. PATENT DOCUMENTS

| | | | | |
|---|---|---|---|---|
| 5,412,864 A | ‡ | 5/1995 | Pack | H01B 7/385 174/23 |
| 6,813,421 B2 | ‡ | 11/2004 | Lail | G02B 6/4411 385/101 |
| 6,968,106 B2 | ‡ | 11/2005 | Chastain | G02B 6/4401 385/109 |

(Continued)

FOREIGN PATENT DOCUMENTS

| | | |
|---|---|---|
| RU | 53811 U1 | 5/2006 |
| RU | 65680 U1 | 8/2007 |

(Continued)

OTHER PUBLICATIONS

Zarde, Steve; "What Kind of Rip Cords are used in Wire and Cable Manufacturing?"; Service Thread; Oct. 4, 2017; 8 Pages; The Wayback Machine—https://web.archive.org/web/20171004084635/ http://www.servicethread.com/ blog/kinds-of-rip-cords-for-wi res-and-cables.‡

(Continued)

*Primary Examiner* — David R Deal
(74) *Attorney, Agent, or Firm* — CANTOR COLBURN LLP

(57) ABSTRACT

A tubing system includes a fluid carrying tubing including an undulating outer surface of peaks and valleys; a jacket encasing the tubing; a string located between the tubing and the jacket, the string configured to cut through the jacket to facilitate removal of the jacket.

4 Claims, 1 Drawing Sheet

(56) References Cited

U.S. PATENT DOCUMENTS

| | | | | |
|---|---|---|---|---|
| 7,113,680 | B2 ‡ | 9/2006 | Hurley | G02B 6/441 385/112 |
| 7,360,461 | B2 * | 4/2008 | Desrochers | G01N 1/26 73/864.81 |
| 7,581,565 | B1 | 9/2009 | Torrance et al. | |
| 8,280,209 | B2 ‡ | 10/2012 | Bollinger, Jr. | G02B 6/4459 385/106 |
| 9,557,503 | B2 ‡ | 1/2017 | Guenter | G02B 6/4432 |
| 10,094,995 | B2 ‡ | 10/2018 | Debban | G02B 6/4434 |
| 11,428,349 | B2 * | 8/2022 | Treichel | F16L 11/20 |
| 2001/0043781 | A1 ‡ | 11/2001 | Yokokawa | G02B 6/4495 385/102 |
| 2002/0104675 | A1 ‡ | 8/2002 | McLeod | H01B 7/046 174/102 R |
| 2004/0200537 | A1 ‡ | 10/2004 | Rivest | F16L 11/1185 138/121 |
| 2004/0217593 | A1 ‡ | 11/2004 | Treichel | F16L 25/0036 285/903 |
| 2005/0281517 | A1 ‡ | 12/2005 | Wessels | G02B 6/4429 385/109 |
| 2006/0060005 | A1 ‡ | 3/2006 | Desrochers | G01N 1/22 73/863.86 |
| 2009/0066083 | A1 ‡ | 3/2009 | Rolland | F16L 25/0036 285/354 |
| 2014/0306448 | A1 ‡ | 10/2014 | Rivest | F16L 25/0036 285/354 |
| 2018/0187803 | A1 ‡ | 7/2018 | Strunk | F16L 11/127 |
| 2019/0078708 | A1 ‡ | 3/2019 | Hudson | B32B 27/12 |
| 2021/0180728 | A1 | 6/2021 | Treichel | |

FOREIGN PATENT DOCUMENTS

| | | | |
|---|---|---|---|
| RU | | 151868 U1 | 4/2015 |
| TW | | I407033 B | 9/2013 |
| WO | | 2008136649 A1 | 11/2008 |
| WO | WO 2008136649 A1 ‡ | | 11/2008 |

OTHER PUBLICATIONS

Author Unknown; "Screened Cables with Ripcord"; Top Cable; Aug. 5, 2016; 2 Pages; The Wayback Machine—https://web.archive.org/web/20160805100550/http://www.topcable.com/blog-electric-cable/en/screened-cables-with-ripcord.‡

United Kingdom Third Party Observations for Application No. GB2011607.5; Issued May 11, 2021; 8 Pages.‡

International Search Report and Written Opinion for Application No. PCT/US2019/047002; dated Oct. 17, 2019, 13 Pages.‡

Taiwan Office Action for Application No. 11120828160; dated Aug. 24, 2022; 7 Pages.

Zarde, Steve; "What Kind of Rip Cords are used in Wire and Cable Manufacturing?"; Service Thread; Oct. 4, 2017. The Wayback Machine—https://web.archive.org/web/20171004084635/http://www.servicethread.com/blog/kinds-of-rip-cords-for-wires-and-cables.

Russian Office Action for Application No. 2021106744/12; dated Jan. 18, 2023; 3 Pages.

Canadian Office Action for Application No. 3,109,387; Issued Oct. 5, 2023; 6 Pages.

European Office Action for Application No. 19854259.9; Issued Jan. 2, 2024; 6 Pages.

\* cited by examiner
‡ imported from a related application

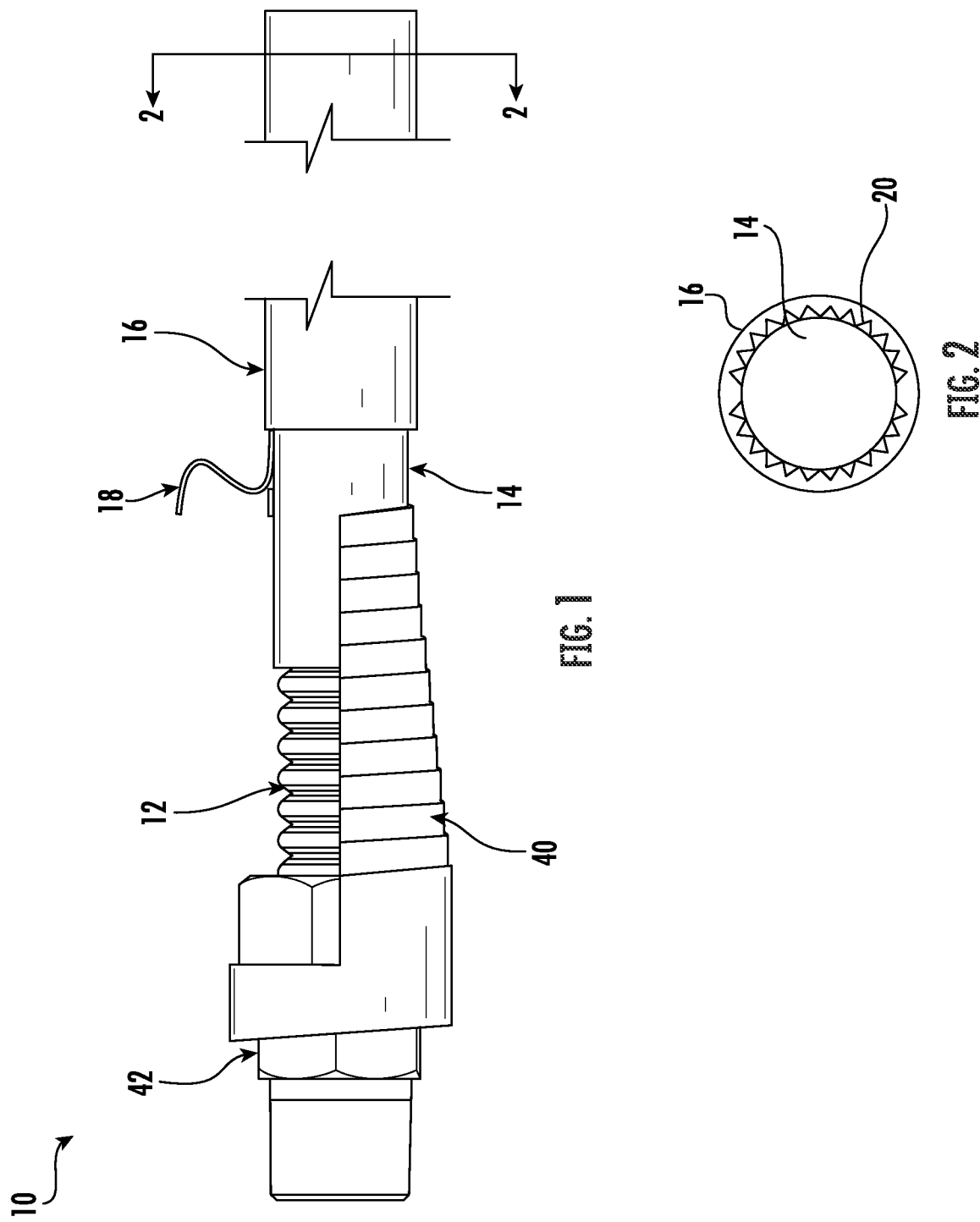

TUBING SYSTEM WITH JACKET

CROSS-REFERENCE TO RELATED APPLICATIONS

This application is a continuation of U.S. patent application Ser. No. 17/269,383, filed Feb. 18, 2021, which is a 371 U.S. National Stage application of PCT/US2019/047002, filed Aug. 19, 2019, which claims the benefit of U.S. Provisional Application No. 62/724,788, filed Aug. 30, 2018, all of which are incorporated by reference in their entirety herein.

BACKGROUND

Flexible gas piping (FGP), also referred to as corrugated stainless steel tubing (CSST), utilizes stainless steel corrugated tubing supplied in rolls or coils with field attachable fittings to distribute gas from a central supply point, such as the meter or regulator, to the various appliances within a house or building. The technology, which has likened the process of plumbing a house for gas to wiring a house for electricity, substantially reduces installation time and hence the associated higher cost of labor.

Tubing containment systems exist in the art to contain fluids if the tubing leaks. One existing tubing containment system is disclosed in U.S. Pat. No. 7,004,510, the entire contents of which are incorporated herein by reference. The tubing containment system of U.S. Pat. No. 7,004,510 uses a sleeve that is suitable for underground installations. A different type of venting system is needed for installations within buildings, particularly in unventilated areas.

SUMMARY

According to an embodiment, a tubing system includes a fluid carrying tubing including an undulating outer surface of peaks and valleys; a jacket encasing the tubing; a string located between the tubing and the jacket, the string configured to cut through the jacket to facilitate removal of the jacket.

In addition to one or more of the features described herein, or as an alternative, further embodiments may include wherein the tubing is corrugated stainless steel tubing.

In addition to one or more of the features described herein, or as an alternative, further embodiments may include wherein the jacket is extruded over the tubing.

In addition to one or more of the features described herein, or as an alternative, further embodiments may include wherein the jacket includes a fire retardant.

According to another embodiment, a method of forming a tubing system includes extruding a jacket over a tubing, the tubing including an undulating outer surface of peaks and valleys; placing a string between the jacket and the tubing, the string configured to cut through the jacket to facilitate removal of the jacket.

In addition to one or more of the features described herein, or as an alternative, further embodiments may include wherein the tubing is corrugated stainless steel tubing.

In addition to one or more of the features described herein, or as an alternative, further embodiments may include wherein the jacket includes a fire retardant.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

FIG. 1 is a side view of a tubing system in an example embodiment.

FIG. 2 is a cross-sectional view taken along line 2-2 of FIG. 1.

DETAILED DESCRIPTION

FIG. 1 is a side view, in partial cross-section, of a tubing system 10. The tubing system 10 includes tubing 12 contained in a first jacket 14. The tubing 12 may be made from metal, and in an example embodiment, is corrugated stainless steel tubing. The tubing 12 may also be helically wound tubing. Tubing 12 may be made from metals other than stainless steel. Tubing 12 has an undulating outer surface of peaks and valleys.

A first jacket 14 encases the tubing 12. The first jacket 14 may be extruded over the tubing 12. The first jacket 14 has a generally smooth, cylindrical inner and outer surface. The first jacket 14 may be made from a thermoplastic, such as low-density polyethylene (LDPE) extruded at a thickness of about 0.030 inches. The first jacket 14 may include fire retardants.

A second jacket 16 encases the first jacket 14. The second jacket 16 may be extruded over the first jacket 14. As such, the tubing 12, the first jacket 14 and the second jacket 16 defined a complete tubing system. The second jacket 16 has a generally smooth, cylindrical outer surface. The inner surface of the second jacket 16 includes circumferentially spaced ribs 20 (FIG. 2) that define groves of channels along the longitudinal axis of the interior surface of the second jacket 16. The second jacket 16 may be made from a thermoplastic, such as low-density polyethylene (LDPE) extruded at a thickness of about 0.030 inches to about 0.050 inches. The second jacket 16 may include fire retardants.

FIG. 2 cross-sectional view taken along line 2-2 of FIG. 1. As shown in FIG. 2, the inner diameter of the second jacket 16 includes a number ribs 20 separated by channels circumferentially spaced on the inner surface of the second jacket 16. The die for extruding the second jacket 16 over the first jacket 14 may include projections to form the ribs 20 and interposed channels. In the event that tubing 12 leaks, fluids travel along channels between ribs 20 for venting at the end of the second jacket 16.

A string 18 may be placed between the first jacket 14 and the second jacket 16. The string 18 may extend along the entire length of tubing 12. When pulled on, the string 18 cuts through the second jacket 16 and facilitates removal of the second jacket 16 without removing or otherwise damaging the first jacket 14.

A fitting 42 may be secured to an end of the tubing 12. Existing fittings may be used, such as the AutoFlare™ fitting available from OmegaFlex, Inc. Optional tape 40, such as self-amalgamating silicone tape, may extend from the fitting to the tubing 12, where code requires such a seal.

The channels on the inside surface of the second jacket 16 allow fluid that escapes through the tubing 12 and first jacket 14 to travel along the inside surface of the second jacket 16 until the fluid reaches the end of the second jacket 16, proximate to fitting 42. As the ends of the tubing 12 are typically located in exposed areas (at a gas meter or gas appliance), the leak can be detected by individuals (e.g., by smell).

While example embodiments have been shown and described, various modifications and substitutions may be made thereto without departing from the spirit and scope of the invention. Accordingly, it is to be understood that the present invention has been described by way of illustration and not limitation.

What is claimed is:

1. A tubing system comprising:
   a fluid carrying tubing including an undulating outer surface of peaks and valleys;
   a first jacket encasing the tubing;
   a second jacket encasing the first jacket; and
   a string located between the first jacket and the second jacket, the string configured to cut through the second jacket to facilitate removal of the second jacket.

2. The tubing system of claim 1 wherein the tubing is corrugated stainless steel tubing.

3. The tubing system of claim 1 wherein the jacket is extruded over the tubing.

4. The tubing system of claim 1 wherein the jacket includes a fire retardant.

\* \* \* \* \*